US008368789B2

(12) United States Patent
Xu et al.

(10) Patent No.: US 8,368,789 B2
(45) Date of Patent: Feb. 5, 2013

(54) SYSTEMS AND METHODS TO PROVIDE REFERENCE CURRENT WITH NEGATIVE TEMPERATURE COEFFICIENT

(75) Inventors: Chen Xu, San Jose, CA (US); Yaowu Mo, Arcadia, CA (US)

(73) Assignee: Aptina Imaging Corporation, George Town (KY)

( * ) Notice: Subject to any disclaimer, the term of this patent is extended or adjusted under 35 U.S.C. 154(b) by 1041 days.

(21) Appl. No.: 12/323,802

(22) Filed: Nov. 26, 2008

(65) Prior Publication Data
US 2010/0128154 A1    May 27, 2010

(51) Int. Cl.
*H04N 5/335* (2006.01)
*H03K 3/38* (2006.01)
*H03K 3/01* (2006.01)
*H03F 3/45* (2006.01)

(52) U.S. Cl. ........ 348/301; 348/300; 323/266; 323/267; 323/268; 323/273; 323/312; 330/253; 330/263; 330/269; 327/528; 327/529; 327/531; 327/534; 327/535; 327/538

(58) Field of Classification Search .......... 323/266–268, 323/273, 312; 348/300, 301; 330/253–261, 330/263, 269–273; 327/528, 529, 531, 534, 327/535, 538
See application file for complete search history.

(56) References Cited

U.S. PATENT DOCUMENTS

| 4,769,589 | A | 9/1988 | Rosenthal |
| 4,890,052 | A | 12/1989 | Hellums |
| 5,604,427 | A | 2/1997 | Kimura |
| 6,452,437 | B1 | 9/2002 | Takeuchi et al. |
| 7,071,767 | B2 | 7/2006 | Ou-yang et al. |
| 2007/0080740 | A1* | 4/2007 | Berens et al. ................. 327/539 |

* cited by examiner

*Primary Examiner* — Evelyn A. Lester

(57) ABSTRACT

Systems and methods for providing one or more reference currents with respective negative temperature coefficients are provided. A first voltage is divided to provide a divided voltage, which is compared to a reference voltage (e.g., a bandgap reference voltage) to provide a control voltage. The first voltage and the one or more reference currents are based on the control voltage.

20 Claims, 11 Drawing Sheets

--PRIOR ART--

SYSTEMS AND METHODS TO PROVIDE REFERENCE CURRENT WITH NEGATIVE TEMPERATURE COEFFICIENT

TECHNICAL FIELD

Embodiments described herein relate generally to reference circuits and more particularly to techniques for providing a reference current with a negative temperature coefficient.

BACKGROUND

Market forces demand that image sensors continue to have ever increasing frame rates and improved gain performance. Accordingly, the analog gain block of modern image sensors, including a differential amplifier, analog-to-digital converter (ADC), etc., is often designed to operate faster and more linearly, leading to greater power consumption. For example, the power consumed by image sensors in the current generation can be greater than twice the power consumed by those in the previous generation. Greater power consumption results in a higher operating temperature for the image sensor. Experimental data shows that a junction temperature of a typical modern image sensor is approximately 30-40° Celsius higher than its ambient temperature, depending on the package module size, material, etc. Consequently, temperature dependence of the image sensor bias has become a significant issue in image sensor design.

Current reference modules are often employed to bias components, such as the analog gain block, of modern image sensors. However, conventional current reference modules typically provide reference currents having positive temperature coefficients, meaning that an increase of temperature leads to a greater reference current value. A greater reference current value causes a greater power consumption, resulting in a higher operating temperature for the image sensor.

Thus, systems and methods for providing a reference current with a negative temperature coefficient are needed to address self-heating issues associated with conventional current reference modules.

BRIEF DESCRIPTION OF THE DRAWINGS

In the drawings, like reference numbers indicate identical or functionally similar elements. Additionally, the leftmost digit(s) of a reference number identifies the drawing in which the reference number first appears.

DETAILED DESCRIPTION

Although CMOS imagers are depicted throughout the following discussion, embodiments described herein can be applied to images captured using any sensor technology, including charge-coupled device (CCD). In fact, while the embodiments described herein refer specifically, and by way of example, to imagers and components thereof, including image sensors, signal processing circuits, and image processing circuits, it will be readily apparent to persons skilled in the relevant art(s) that the embodiments are equally applicable to other devices and systems. It will also be readily apparent to persons skilled in the relevant art(s) that the embodiments are applicable to any apparatus or system requiring a reference current having a negative temperature coefficient.

Embodiments described herein address self-heating issues associated with conventional current reference modules. A negative feedback loop is used to generate one or more reference currents having respective negative temperature coefficients. The reference currents may be used to bias components of the analog signal chain in an imager, for example. The analog signal chain may include any analog circuitry that is external to the pixel array of the imager. The embodiments may be used to reduce power consumption, dark current, and/or the number of hot pixels associated with the imager. The embodiments may have any of a variety of other advantages resulting from a lower sensor junction temperature during operation of the imager.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment.

Figure 1:
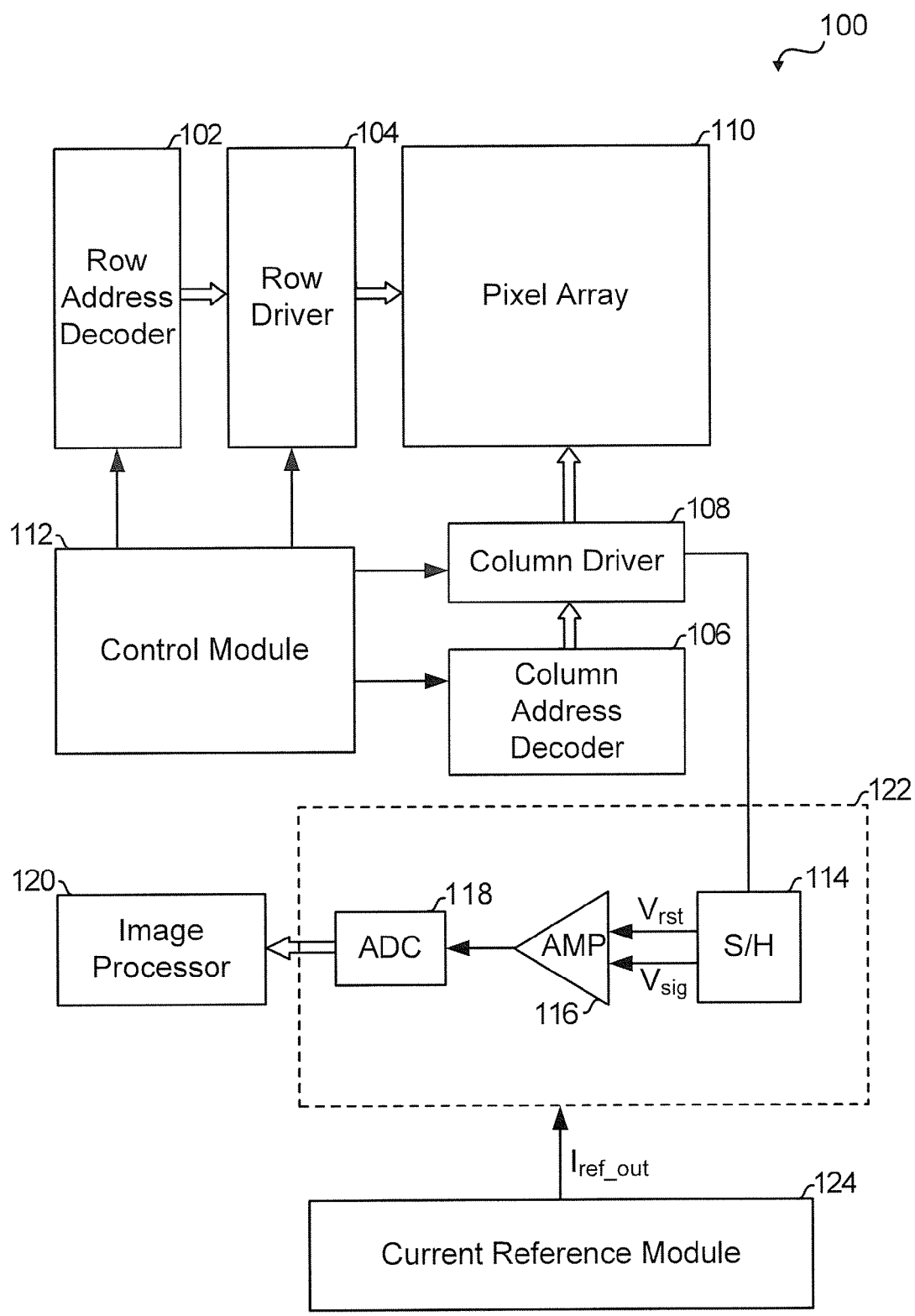
FIG. 1 is an example implementation of an imager in accordance with an embodiment disclosed herein.

FIG. 1 is an example implementation of an imager in accordance with an embodiment disclosed herein. In FIG. 1, imager 100 is a complementary metal-oxide-semiconductor (CMOS) imager, which includes a pixel array 110 having a plurality of pixels arranged in a predetermined number of columns and rows. The pixels in a given row of pixel array 110 are turned on at the same time by a row select line, and the pixel signals of each column are selectively provided to output lines by column select lines. A plurality of row and column select lines is provided for the entire pixel array 110.

Row driver 104 selectively activates the row lines in response to row address decoder 102. Column driver 108 selectively activates the column select lines in response to column address decoder 106. Thus, a row and column address is provided for each pixel in pixel array 110.

Control module 112 controls row address decoder 102 and column address decoder 106 for selecting the appropriate row and column select lines for pixel image acquisition and readout. Control module 112 further controls row driver 104 and column driver 108, which apply driving voltages to the respective drive transistors of the selected row and column select lines.

A processing module 122 (commonly referred to as the analog gain block) performs correlated double sampling using a pixel reset signal $V_{rst}$ and a pixel image signal $V_{sig}$ obtained from pixels of pixel array 110 to provide digital output signals for the pixels. Processing module 122 includes a sample-and-hold (S/H) circuit 114 associated with column driver 108 that reads the pixel reset signal $V_{rst}$ and the pixel image signal $V_{sig}$ for the selected pixels. Differential amplifier (amp) 116 generates a differential signal (e.g., $V_{rst}-V_{sig}$) for each pixel. Analog-to-digital converter (ADC) 118 digitizes each of the differential signals to provide the digital output signals, which are provided to image processor 120.

Although one S/H circuit 114, differential amplifier 116, and ADC 118 are shown in FIG. 1, which may be selectively coupled to the column lines of pixel array 110, this is merely one representative structure. A S/H circuit 114, differential amplifier 116, and ADC 118 may be provided for each column line of pixel array 110. Other arrangements using S/H circuits 114, differential amplifiers 116, and ADCs 118 for sampling and providing digital output signals for the pixels of array 110 may also be used.

An image processor 120 manipulates the digital output signals to provide an output image color reproduction represented by the plurality of pixels in pixel array 110. Image processor 120 may perform any of a variety of operations, including but not limited to positional gain adjustment, defect correction, noise reduction, optical crosstalk reduction, demosaicing, resizing, sharpening, etc. Image processor 120 may be on the same chip as imager 100, on a different chip than imager 100, or on a different stand-alone processor that receives image signals from imager 100.

A current reference module 124 provides at least one reference current having a negative temperature coefficient for biasing one or more of the components (e.g., differential amplifier 116, analog-to-digital converter (ADC) 118, etc.) of processing module 122.

Figure 2:
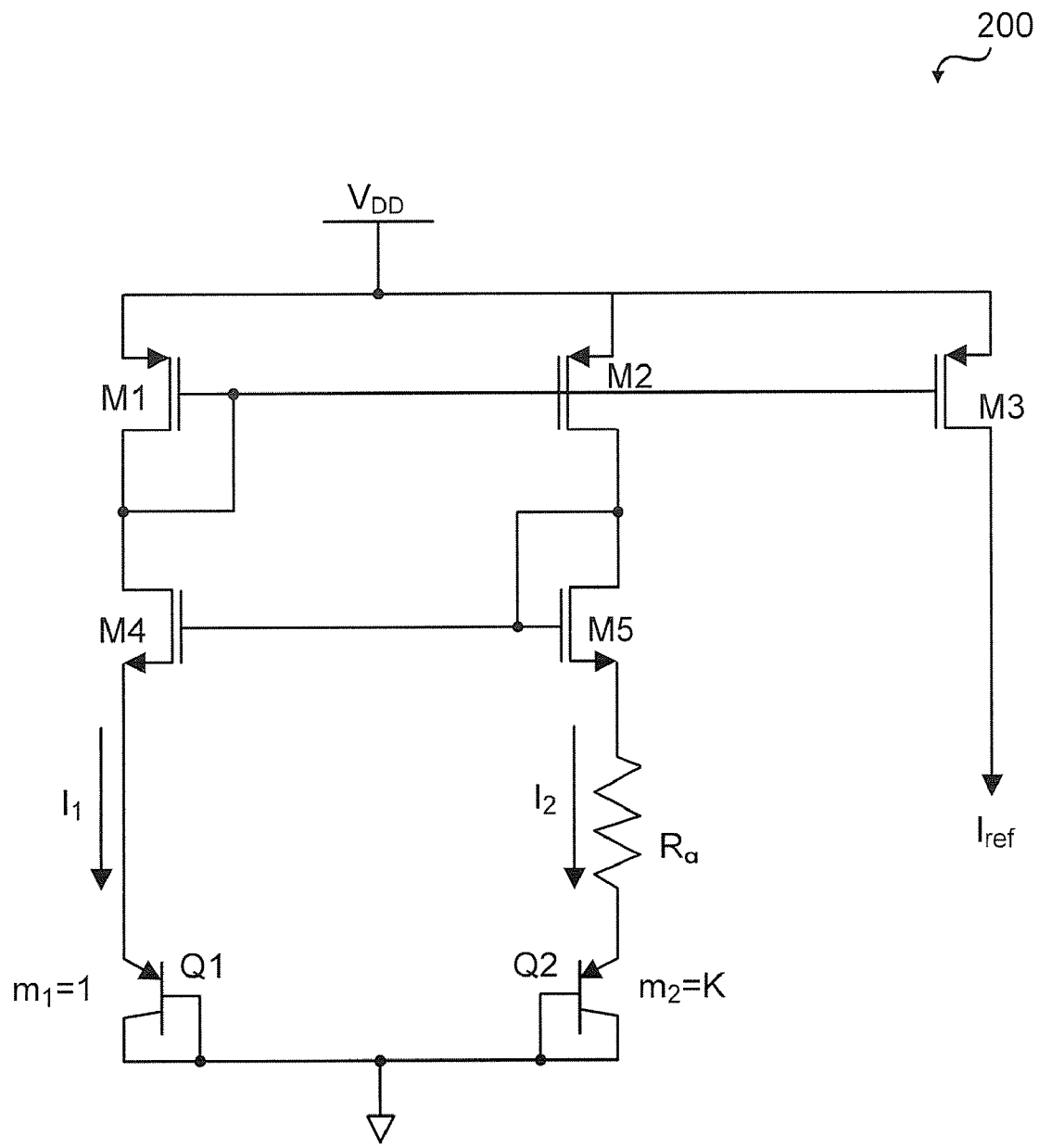
FIG. 2 is a schematic of a conventional current reference module having a proportional to absolute temperature (PTAT) topology.

A background discussion of the problems associated with a conventional current reference topology may be useful in highlighting the benefits of the current reference module 124 of FIG. 1, example implementations of which are discussed below with reference to FIGS. 3-6. For example, FIG. 2 is a schematic of a conventional current reference module 200 having a proportional to absolute temperature (PTAT) topology. Current reference module 200 includes metal-oxide-semiconductor (MOS) transistors M1-M5, a resistor $R_a$, and bipolar transistors Q1-Q2. Transistors M1-M3 share a common gate connection and each have a source coupled to a first reference potential $V_{DD}$. A drain of transistor M1 is coupled to a gate of transistor M1 and a drain of transistor M4. A drain of transistor M2 is coupled to a gate of transistor M5 and a drain of transistor M5. Transistors M4-M5 share a common gate connection. A source of transistor M4 is coupled to an emitter of bipolar transistor Q1. A source of transistor M5 is coupled to an emitter of bipolar transistor Q2 through resistor $R_a$. Bipolar transistors Q1 and Q2 share a common base connection and a common collector connection, both of which are coupled to a second reference potential (e.g., a ground potential). Transistor M3 provides a reference current at its drain that is proportional to absolute temperature (PTAT).

The variable m indicates the emitter/base area factor of the bipolar transistor. As shown in FIG. 2, bipolar transistor Q1 has a factor $m_1=1$, and bipolar transistor Q2 has a ratio $m_2=K$, indicating that the emitter to base junction area of Q2 is K times the emitter to base junction area of Q1. As a result, the current density of Q2 is K times the current density of Q1. Typical values of K may be, for example, 8, 15, or 48, but K is not limited to such values.

The reference current $I_{ref}$ generated by current reference module 200 may be represented by the following equation:

$$I_{ref} = \frac{\Delta V_{BE}}{R_a} \qquad \text{Equation 1}$$

$$= \frac{V_{BE2} - V_{BE1}}{R_a}$$

$$= \frac{nV_T\ln\left(K*\frac{I_2}{I_S}\right) - nV_T\ln\left(\frac{I_1}{I_S}\right)}{R_a}$$

where $V_{BE2}$ is the emitter-base voltage of bipolar transistor Q2, and $V_{BE1}$ is the emitter-base voltage of bipolar transistor Q1. The variable n is an experimental parameter for the bipolar transistors Q1-Q2, which varies from process to process and is therefore characterized for each process. In equation 1, K is a multiplier representing the ratio of $m_2$ to $m_1$. The variable $V_T$ is the thermal threshold voltage for bipolar transistors Q1-Q2. Persons skilled in the relevant art(s) will recognize that $V_T$ equals kT/q, where k is the Boltzmann constant, T is the absolute temperature, and q is the magnitude of electrical charge. The variable $I_S$ is a scale current of the bipolar transistors Q1-Q2 and may be described using the relationship:

$$I_S \propto A_D\left(\frac{1}{N_A} + \frac{1}{N_D}\right) \qquad \text{Equation 2}$$

where $A_D$ is the area of the junction region for each bipolar transistor Q1 and Q2, $N_A$ is the doping concentration of electron acceptors in each junction region (i.e., in the P side of the junctions), and $N_D$ is the doping concentration of electron donors in each junction region (i.e., in the N side of the junctions). Equation 2 assumes that bipolar transistors Q1-Q2 have the same junction region area and doping concentrations, though persons skilled in the relevant art(s) will recognize that bipolar transistors Q1-Q2 may have different junction region areas and/or doping concentrations, which may lead to the bipolar transistors Q1-Q2 having different scale currents.

In FIG. 2, transistors M1, M2, M4, and M5 form a current mirror, such that current $I_2$ is forced to be equal to current $I_1$. (It should be noted, however, that the configuration shown in FIG. 2 is but one of many ways of forming a current mirror known to those in the art, and one skilled in the art would understand that embodiments would not be limited to only those with a current mirror configured as shown in FIG. 2). Thus, equation 1 can be simplified as follows:

$$I_{ref} = \frac{nV_T\ln K}{R_a} \qquad \text{Equation 3}$$

Taking the partial derivative of $I_{ref}$ with respect to temperature T provides:

$$\frac{\partial I_{ref}}{\partial T} = \frac{nV_T\ln K}{R_a}\left(\frac{1}{V_T}\frac{\partial V_T}{\partial T} - \frac{1}{R_a}\frac{\partial R_a}{\partial T}\right) \qquad \text{Equation 4}$$

$$= \frac{nV_T\ln K}{R_a}\left(\frac{1}{V_T}\frac{k}{q} - \frac{1}{R_a}\frac{\partial R_a}{\partial T}\right)$$

Solving equation 4 for the temperature coefficient of $I_{ref}$ provides:

$$TC\_I_{ref} = \frac{1}{I_{ref}} \frac{\partial I_{ref}}{\partial T} \qquad \text{Equation 5}$$
$$= \frac{1}{V_T} \frac{k}{q} - \frac{1}{R_a} \frac{\partial R_a}{\partial T}$$

Laboratory testing of one implementation of the conventional current reference module 200 shown in FIG. 2 reveals that the reference current $I_{ref}$ has a temperature coefficient of approximately +3000 parts-per-million (ppm) at a temperature of 25° Celsius. This positive temperature coefficient is problematic because the junction temperature of the image sensor increases with continued operation. The increasing junction temperature causes the reference current $I_{ref}$ to increase due to the positive temperature coefficient of +3000 ppm. For example, if the reference current $I_{ref}$ equals 10 microamperes (μA) at 25° Celsius, the reference current $I_{ref}$ increases by another 20% to 12 μA if temperature increases to 55° Celsius. The greater reference current $I_{ref}$ leads to greater power consumption because the analog power is the product of the reference current $I_{ref}$ and the operation voltage. Greater power consumption further heats up the image sensor and increases the junction temperature, resulting in a positive feedback loop (referred to as self-heating). Self-heating causes a substantial increase of dark current and "hot pixels" in the image sensor. For example, if multiple processing modules in an imaging system are supplied from reference current $I_{ref}$, power consumption of the imaging system would increase significantly.

The junction temperature of the image sensor continues to increase until the dynamic static point of the image sensor is reached. The dynamic static point is the temperature at which the image sensor is able to dissipate heat that is generated in the image sensor sufficiently that the junction temperature of the image sensor stops increasing. Image sensor packages are usually made of plastic, which is known to have a worse self-heating problem than other packaging materials, such as ceramic. The self-heating problem is more prominent in mobile image sensor applications due to the relatively smaller image sensor packages in such applications. The self-heating problem is more important in mobile applications because dark current and hot pixels are critical performance measures that facilitate determining the quality of image sensor products.

FIGS. 3-6 are example implementations of the current reference module 124 shown in FIG. 1 in accordance with embodiments disclosed herein. Each example implementation provides one or more reference currents having negative temperature coefficients that are capable of addressing self-heating issues associated with conventional current reference modules, as discussed above with reference to conventional current reference module 200.

Figure 3:
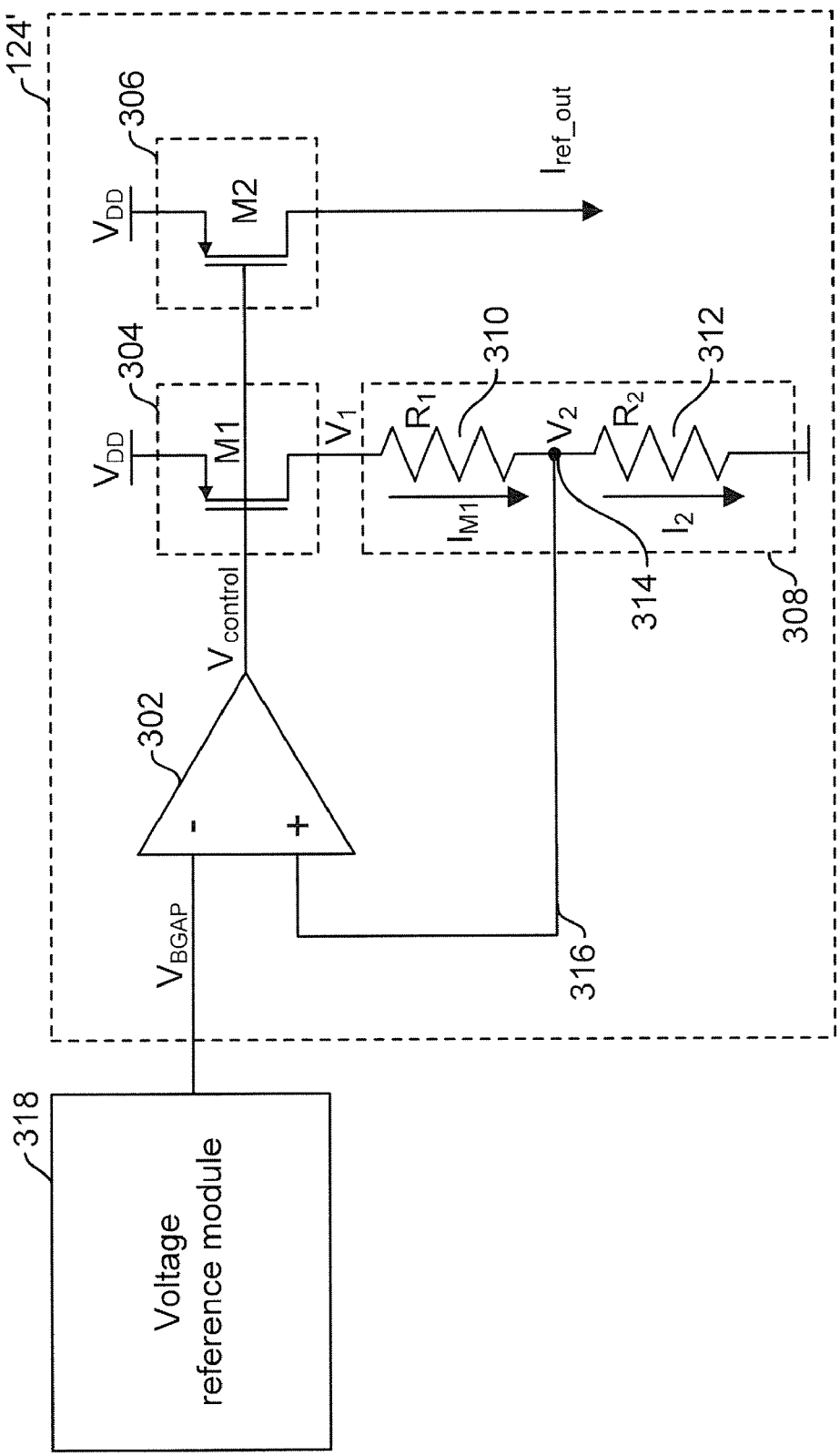
FIGS. 3 and 5-7 are example implementations of the current reference module shown in FIG. 1 in accordance with embodiments disclosed herein.

Referring to FIG. 3, current reference module 124' includes an operational amplifier 302, an amplification module 304, a voltage divider module 308, and a current module 306. Operational amplifier 302 has an inverting input terminal, a non-inverting input terminal, and an output terminal. Operational amplifier 302 receives a reference voltage $V_{BGAP}$ at the inverting input terminal and a divided voltage $V_2$ at the non-inverting input terminal. The reference voltage is labeled "$V_{BGAP}$" to indicate that the reference voltage may be a bandgap reference voltage, though the embodiments described herein are not limited in this respect. The reference voltage is substantially insensitive to a temperature change, regardless whether the reference voltage is a bandgap reference voltage or otherwise.

Operational amplifier 302 compares the reference voltage $V_{BGAP}$ to the divided voltage $V_2$ to provide a control signal $V_{control}$, which is based on the difference between $V_{BGAP}$ and $V_2$. Amplification module 304 provides a first voltage $V_1$ based on the control signal $V_{control}$ received from operational amplifier 302. Voltage divider 308 provides the divided voltage $V_2$ proportional to the first voltage $V_1$. Current module 306 provides a reference current $I_{ref\_out}$ having a negative temperature coefficient, based on the control signal $V_{control}$ received from operational amplifier 302.

Voltage divider 308 is shown in FIG. 3 to be a resistor ladder, including a first resistor 310 and a second resistor 312, for illustrative purposes. First and second resistors 310, 312 may be polysilicon resistors, diffusion resistors, or any other type of resistors. First and/or second resistors 310, 312 may be configured to have a slightly positive temperature coefficient (e.g., several hundred parts-per-million). First and second resistors 310, 312 may be integrated into a substrate of current reference module 124' or external to such a substrate. First resistor 310 is coupled between an output node of amplification module 304 and an intermediate node 314. Second resistor 312 is coupled between the intermediate node 314 and a reference potential (e.g., a ground potential). The resistor ladder of FIG. 3 divides the first voltage $V_1$ to provide the divided voltage $V_2$ at the intermediate node 314 in accordance with the following equation:

$$V_2 = V_1 \left( \frac{R_2}{R_1 + R_2} \right) \qquad \text{Equation 6}$$

where $R_1$ is the resistance of first resistor 310, and $R_2$ is the resistance of second resistor 312. It will be recognized by persons skilled in the relevant art(s) that the configuration of voltage divider 308 shown in FIG. 3 is merely one example, and other configurations may be used. A feedback 316 is coupled between the intermediate node 314 and the non-inverting input of operational amplifier 302 to enable operational amplifier 302 to compare the reference voltage $V_{BGAP}$ to the divided voltage $V_2$.

Amplification module 304 and current module 306 are shown in FIG. 3 to be respective first and second transistors (M1 and M2) for illustrative purposes. In particular, amplification module 304 and current module 306 are shown to be respective complementary-metal-oxide-semiconductor (CMOS) transistors having respective gates coupled to the output terminal of operational amplifier 302 and respective sources coupled to a first reference potential $V_{DD}$. Operational amplifier 302 biases the CMOS transistors M1, M2 by providing the control voltage to the gates of the respective CMOS transistors. A drain of the first transistor M1 is coupled to a second reference potential (e.g., a ground potential) through voltage divider 308. A drain of the second transistor M2 provides the reference current $I_{ref\_out}$ having the negative temperature coefficient. The relationship between the reference current $I_{ref\_out}$ and the drain current $I_{M1}$ of the first transistor M1, may be defined by the following equation:

$$\frac{I_{ref\_out}}{I_{M1}} = \left( \frac{W_2/L_2}{W_1/L_1} \right) \qquad \text{Equation 7}$$

where $W_2$ and $L_2$ are the respective width and length of the second transistor M2, and W1 and L1 are the respective width and length of the first transistor M1. Persons skilled in the relevant art(s) will recognize that amplification module 304 and/or current module 306 may be any type of transistor(s), may include other component(s), etc.

Feedback 316 facilitates maintaining the first voltage $V_1$ and the divided voltage $V_2$ at substantially constant values having temperature coefficients of approximately zero. For example, if the divided voltage $V_2$ at intermediate node 314 increases, the voltage at the non-inverting input terminal of operational amplifier 302 increases because feedback 316 couples intermediate node 314 to the non-inverting input terminal. However, the reference voltage $V_{BGAP}$ at the inverting input terminal of operational amplifier 302 is substantially constant even during temperature variations. The difference between the divided voltage $V_2$ and the reference voltage $V_{BGAP}$ therefore increases, causing the control voltage $V_{control}$ at the output terminal of operational amplifier 302 to increase. As the control voltage $V_{control}$ increases, the gate-to-source voltage of the first transistor M1, which equals $V_{DD} - V_{control}$, decreases, causing the drain current $I_{M1}$ to decrease. The divided voltage $V_2$ consequently decreases because the drain current $I_{M1}$ flowing across the second resistor R2 decreases. In an example implementation, current reference module 124' may be fully functional for $V_{DD}$ values within a range, such as from 2.4 volts (V) to 3.1 V, and/or within a temperature range, such as from −30° C. to +70° C. It will be recognized by persons skilled in the relevant art(s) that the example ranges provided above are for illustration purposes and are not intended to be limiting. Current reference module 124' may be fully functional at $V_{DD}$ values and/or temperatures not specified above.

A voltage reference module 318 is shown in FIG. 3 to provide the reference voltage $V_{BGAP}$ to the inverting input terminal of operational amplifier 302. Voltage reference module 318 may be a bandgap voltage reference module, which is commonly known in the art to provide a reference voltage that is near the theoretical bandgap of the substrate material used to fabricate the bandgap voltage reference module at 0 Kelvin. However, persons skilled in the relevant art(s) will recognize that voltage reference module 318 may be any suitable type of module that is capable of providing a reference voltage that is substantially insensitive to a temperature change. Voltage reference module 318 may be included in current reference module 124' or may be external to current reference module 124'. Voltage reference module 318 may be on the same chip as current reference module 124' or on a different chip.

Figure 4:
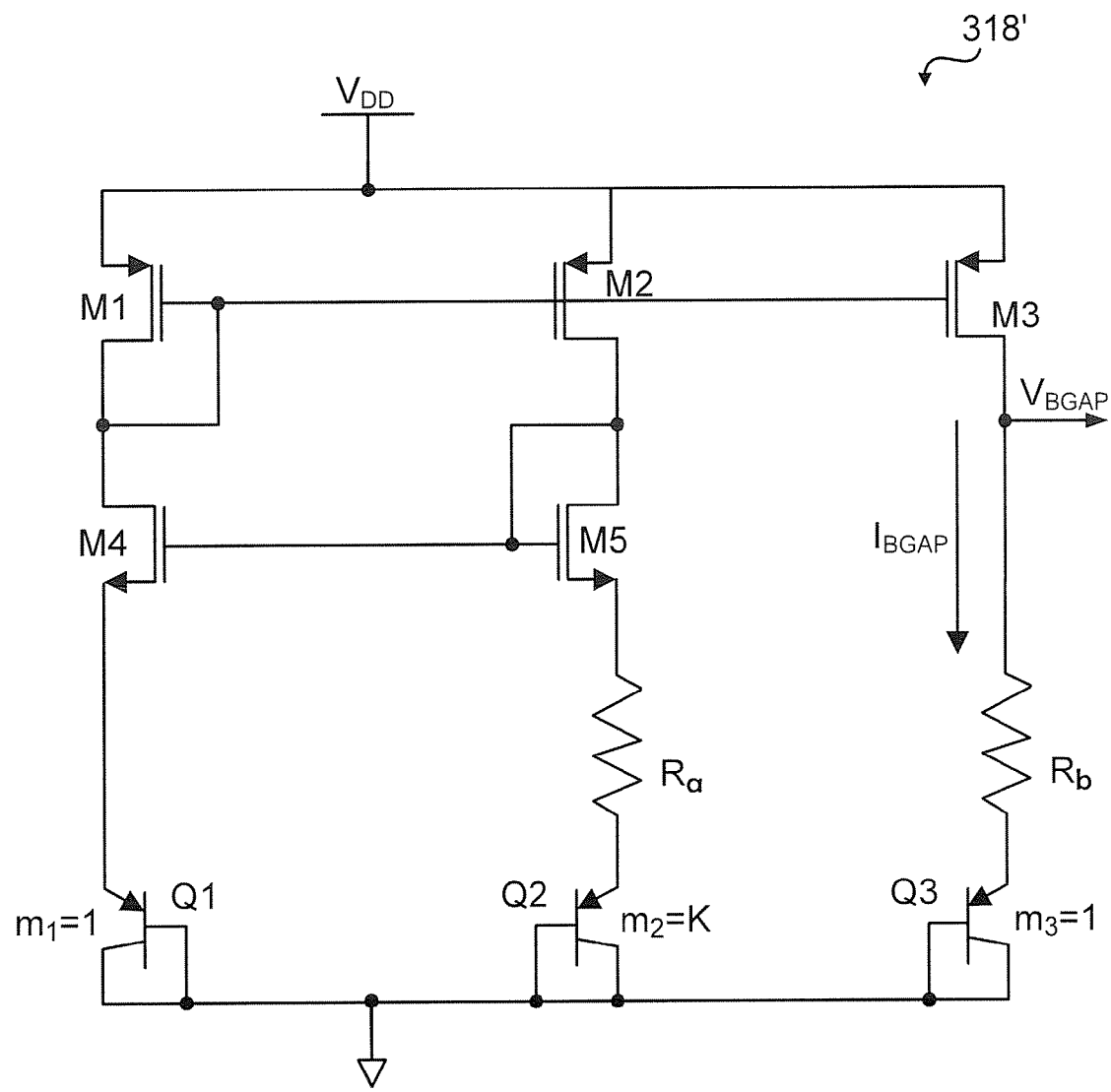
FIG. 4 is an example implementation of a bandgap voltage reference module in accordance with an embodiment disclosed herein.

FIG. 4 is an example implementation of a bandgap voltage reference module 318' in accordance with an embodiment disclosed herein. In FIG. 4, bandgap voltage reference module 318' includes metal-oxide-semiconductor (MOS) transistors M1-M5, a first resistor $R_a$, a second resistor $R_b$, and bipolar transistors Q1-Q3. Transistors M1-M3 share a common gate connection and each have a source coupled to a first reference potential $V_{DD}$. A drain of transistor M1 is coupled to a gate of transistor M1 and a drain of transistor M4. A drain of transistor M2 is coupled to a gate of transistor M5 and a drain of transistor M5. Transistors M4-M5 share a common gate connection. A source of transistor M4 is coupled to an emitter of bipolar transistor Q1. A source of transistor M5 is coupled to an emitter of bipolar transistor Q2 through first resistor $R_a$. A source of transistor M3 is coupled to an emitter of bipolar transistor Q3 through second resistor $R_b$. Bipolar transistors Q1-Q3 share a common base connection and a common collector connection, both of which are coupled to a second reference potential (e.g., a ground potential). Transistor M3 provides a bandgap reference voltage at its drain that has a temperature coefficient of substantially zero. For example, the bandgap reference voltage may have a temperature coefficient of less than 50 ppm (e.g., 30 ppm) when the temperature of bandgap voltage reference module 318' is 25° C.

The ratio of the width of a transistor to the length of the transistor may be represented by a variable m. As shown in FIG. 4, bipolar transistor Q1 has a ratio $m_1 = 1$, and bipolar transistor Q2 has a ratio $m_2 = K$, indicating that the width of bipolar transistor Q2 is K times the emitter to base junction area of Q1. Bipolar transistor Q3 has a ratio $m_3 = 1$, indicating that the emitter to base junction area of Q3 is approximately equal to the emitter to base junction area of Q1.

In the following discussion, the temperature coefficient of the bandgap reference voltage $V_{BGAP}$ is derived with reference to equations 8-11, and the temperature coefficient of the reference current $I_{ref\_out}$ is derived with reference to equations 12-15 Referring to FIG. 4, the bandgap reference voltage $V_{BGAP}$ may be represented using the following equation:

$$V_{BGAP} = I_{BGAP} * R_b + V_{BE} \qquad \text{Equation 8}$$

where $I_{BGAP}$ is the bandgap current reference shown in FIG. 3. The bandgap current reference $I_{BGAP}$ may be defined using equation 3, which is described above with reference to the reference current $I_{ref}$ generated by current reference module 200 in FIG. 2. Incorporating equation 3 into equation 8 provides:

$$V_{BGAP} = \frac{nV_T \ln K}{R_a} * R_b + V_{BE} \qquad \text{Equation 9}$$

Taking the partial derivative of the $V_{BGAP}$ with respect to temperature provides:

$$\frac{\partial V_{BGAP}}{\partial T} = n \ln K \left(\frac{R_b}{R_a}\right)\left(\frac{k}{q}\right) + \frac{\partial V_{BE}}{\partial T} \qquad \text{Equation 10}$$

Using equation 10, the temperature coefficient of the bandgap reference voltage $V_{BGAP}$ may be represented as follows:

$$\begin{aligned}\text{TC\_}V_{BGAP} &= \frac{1}{V_{BGAP}}\left(\frac{\partial V_{BGAP}}{\partial T}\right) \\ &= \frac{1}{V_{BGAP}}\left[n \ln K\left(\frac{R_b}{R_a}\right)\left(\frac{k}{q}\right) + \frac{\partial V_{BE}}{\partial T}\right]\end{aligned} \qquad \text{Equation 11}$$

The quantity $$\left(\frac{k}{q}\right)$$

is proportional to the absolute temperature (PTAT). The quantity $$\frac{\partial V_{BE}}{\partial T},$$

on the other hand, is complimentary to absolute temperature (CTAT). Persons skilled in the relevant art(s) will recognize that the variables K, $R_a$, and $R_b$ may be chosen such that the CTAT quantity substantially or completely cancels the PTAT quantity, resulting in a temperature coefficient of substantially zero for the bandgap reference voltage $V_{BGAP}$.

The temperature coefficient of the reference current $I_{ref\_out}$ is derived below with reference to FIG. 3. Assuming for the purposes of discussion that the gain of operational amplifier 302 is infinite, the divided voltage $V_2$ is substantially equal to the bandgap reference voltage $V_{BGAP}$. Thus, the current $I_2$ that flows across second resistor 312 in FIG. 3 may be represented by the equation:

$$I_2 = \frac{V_2}{R_2} \qquad \text{Equation 12}$$
$$\approx \frac{V_{BGAP}}{R_2}$$

The derivative of the reference current $I_{ref\_out}$ with respect to temperature may be expressed as follow:

$$\frac{\partial I_{ref\_out}}{\partial T} = \frac{\left(\frac{W_{M2}}{L_{M2}}\right)}{\left(\frac{W_{M1}}{L_{M1}}\right)} \frac{\partial I_2}{\partial T} \qquad \text{Equation 13}$$

$$= \frac{\left(\frac{W_{M2}}{L_{M2}}\right)}{\left(\frac{W_{M1}}{L_{M1}}\right)} \frac{V_2}{R_2} \left(\frac{1}{V_{BGAP}} \frac{\partial V_{BGAP}}{\partial T} - \frac{1}{R_2} \frac{\partial R_2}{\partial T}\right)$$

If the bandgap reference voltage $V_{BGAP}$ is designed to have a temperature coefficient of substantially zero (i.e., $$\frac{\partial V_{BGAP}}{\partial T} \approx 0\Big),$$

then equation 12 may be simplified as:

$$\frac{\partial I_{ref\_out}}{\partial T} = \frac{\left(\frac{W_{M2}}{L_{M2}}\right)}{\left(\frac{W_{M1}}{L_{M1}}\right)} \frac{V_2}{R_2}\left(-\frac{1}{R_2}\frac{\partial R_2}{\partial T}\right) \qquad \text{Equation 14}$$

Using equation 14, the temperature coefficient of the reference current $I_{ref\_out}$ may be expressed as:

$$TC\_I_{ref\_out} = \frac{1}{I_{ref\_out}} \frac{\partial I_{ref\_out}}{\partial T} \qquad \text{Equation 15}$$

$$= \frac{1}{I_{ref\_out}}\left[\frac{\left(\frac{W_{M2}}{L_{M2}}\right)}{\left(\frac{W_{M1}}{L_{M1}}\right)} \frac{V_2}{R_2}\left(-\frac{1}{R_2}\frac{\partial R_2}{\partial T}\right)\right]$$

$$= -\frac{1}{R_2}\frac{\partial R_2}{\partial T}$$

The temperature coefficient of the reference current $I_{ref\_out}$ may be dependent on the process used for fabricating current reference module 124'. For instance, the temperature coefficient of the reference current $I_{ref\_out}$ may be −300 parts-per-million (ppm) using one process and −700 ppm using another. Reference current module 124' may be configured such that the absolute value of the temperature coefficient of the reference current $I_{ref\_out}$ is less than a predetermined value. For example, reference current module 124' may be configured to provide a temperature coefficient for the reference current $I_{ref\_out}$ of 500 ppm when the temperature of voltage divider 308 is 25° C., less than 1000 ppm when the temperature of voltage divider 308 is 25° C., or any other value that is capable of addressing the self-heating issues associated with conventional current reference modules.

Figure 5:
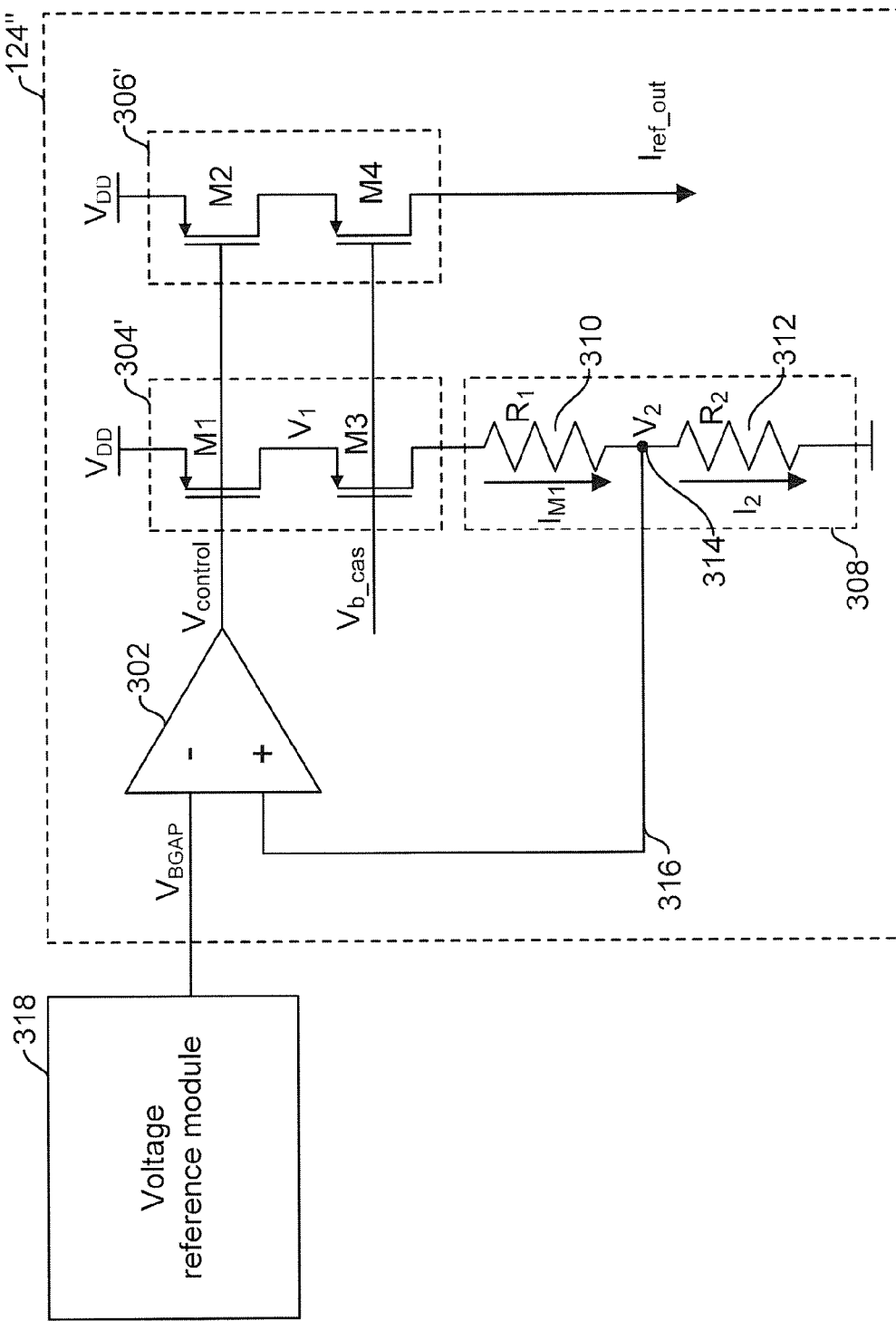

FIG. 5 illustrates a current reference module 124'' including cascode-connected transistors in accordance with an embodiment described herein. In FIG. 5, amplification module 304' includes transistors M1 and M3, which are coupled in a cascode configuration. A drain of transistor M1 is coupled to a source of transistor M3. A drain of transistor M3 is coupled to voltage divider 308. Current module 306' includes transistors M2 and M4, which are coupled in a cascode configuration. A drain of transistor M2 is coupled to a source of transistor M4, and the reference current $I_{ref\_out}$ is provided at a drain of transistor M4. Transistors M3 and M4 share a common gate connection, which receives control signal $V_{b\_cas}$ for biasing transistors M3 and M4. The implementation of cascode-connected transistors, as shown in FIG. 5, may improve the driving capability of amplification module 304' and/or current module 306', for example.

Figure 6:
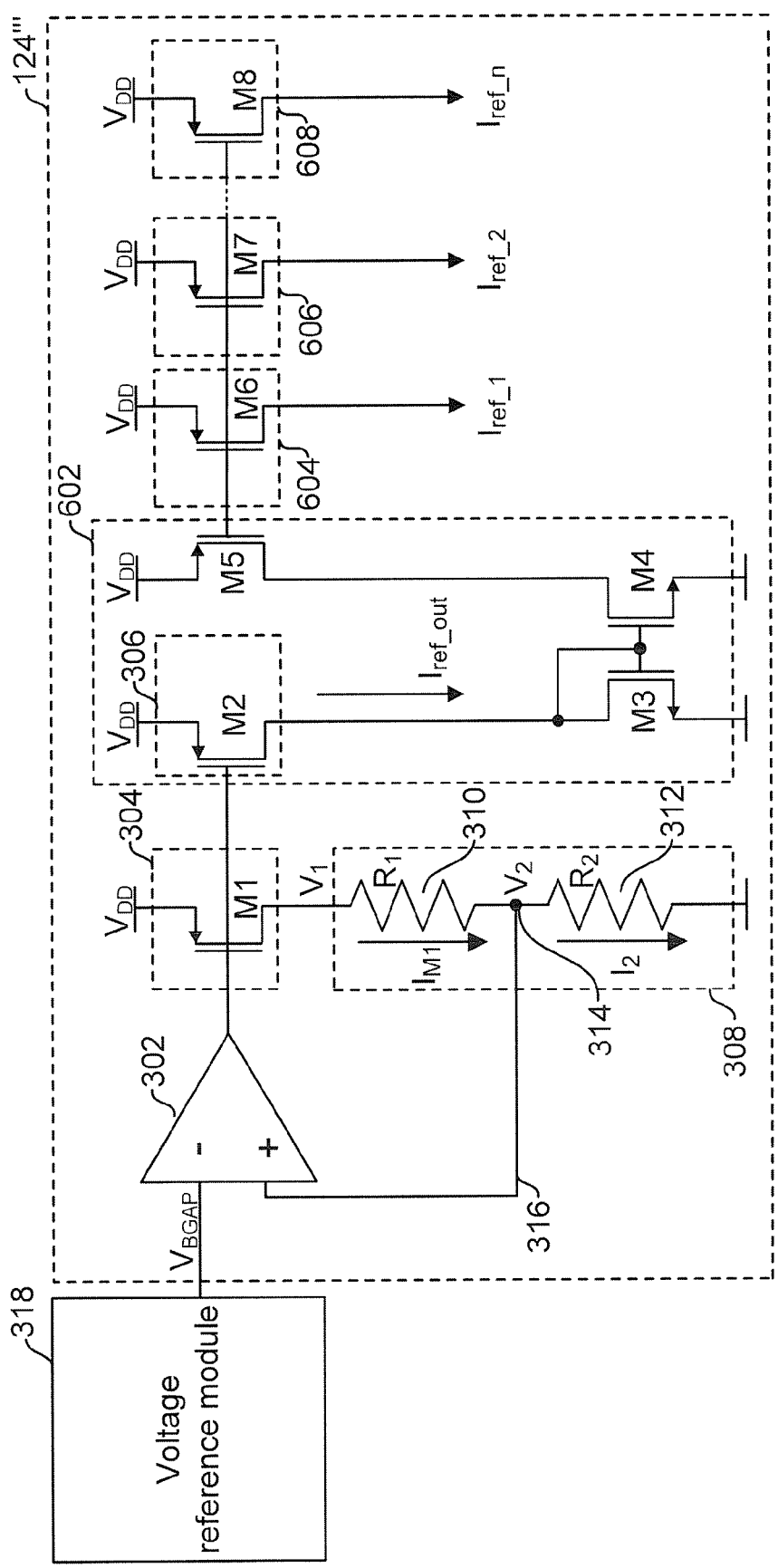

FIG. 6 illustrates a current reference module 124''' that is configured to provide a plurality of reference currents, each having a negative temperature coefficient, in accordance with an embodiment described herein. In FIG. 6, a current mirror module 602 mirrors the reference current $I_{ref\_out}$ to generate a plurality of reference currents $I_{ref\_1}$, $I_{ref\_2}$, and $I_{ref\_n}$ proportional to the reference current $I_{ref\_out}$ provided by current module 306. Current mirror module 602 includes transistors M2-M5 for mirroring the reference current $I_{ref\_out}$ from current module 306 to a drain of transistor M5. The drain of transistor M2 is coupled to a drain and a gate of transistor M3 and a gate of transistor M4. Sources of respective transistors M3 and M4 are coupled to the second reference potential (e.g., a ground potential) for illustrative purposes. A drain of transistor M4 is coupled to the drain of transistor M5. A source of transistor M5 is coupled to the first reference potential $V_{DD}$.

Adjustable current modules 604, 606, and 608 provide the respective reference currents $I_{ref\_1}$, $I_{ref\_2}$, and $I_{ref\_n}$, each having a negative temperature coefficient. For example, the control voltage $V_{control}$ at the output terminal of operational amplifier 302 may be changed to adjust the reference currents $I_{ref\_1}$, $I_{ref\_2}$, and $I_{ref\_n}$. Three current modules are shown to be connected to the output of current mirror module 602 for illustrative purposes, though persons skilled in the relevant art(s) will recognize that any number of current mirror modules may be coupled to the output of current mirror module 602 (e.g., one, two, three, etc.). Current modules 604, 606, and 608 are shown in FIG. 6 to be respective transistors M6-M8 for illustrative purposes. In particular, current modules 604, 606, and 608 are shown to be respective CMOS transistors having respective gates coupled to a gate of transistor M5 and respective sources coupled to the first reference potential $V_{DD}$. Drains of the respective transistors M6-M8 provide the respective reference currents $I_{ref\_1}$, $I_{ref\_2}$, and $I_{ref\_n}$.

Figure 7:
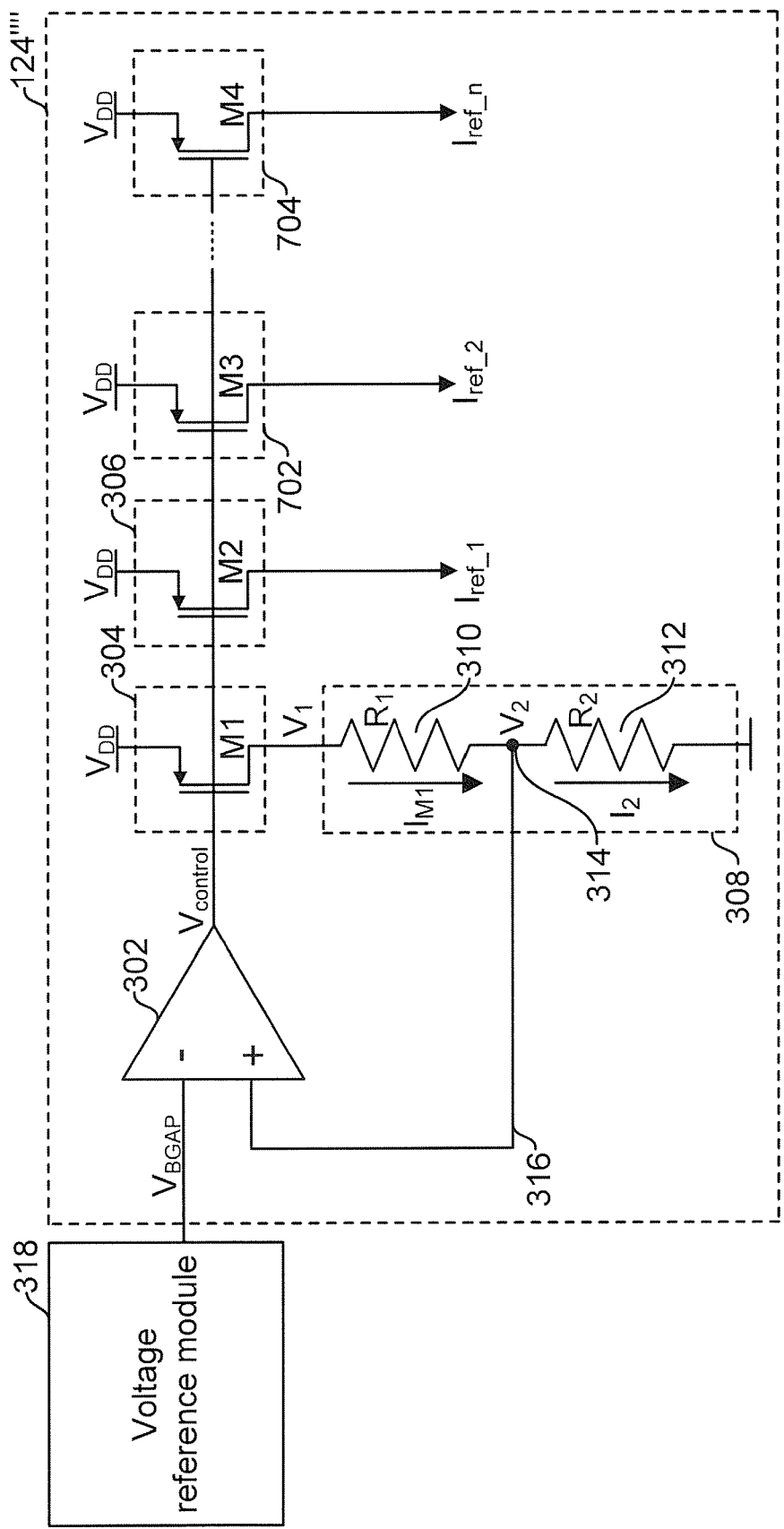

FIG. 7 illustrates a current reference module 124'''' that is configured to provide a plurality of reference currents, each having a negative temperature coefficient, in accordance with another embodiment described herein. Current reference module 124"" includes n adjustable current modules 306, 702, and 704 that provide respective reference currents $I_{ref\_1}$, $I_{ref\_2}$, and $I_{ref\_n}$. It should be noted that current reference module 124"" may include any number of current modules. Current modules 306, 702, and 704 are shown in FIG. 7 to be respective transistors M2-M4 for illustrative purposes. In particular, current modules 306, 702, and 704 are shown to be respective CMOS transistors having respective gates coupled to the gate of transistor M1 and respective sources coupled to the first reference potential $V_{DD}$. Drains of the respective transistors M2-M4 provide the respective reference currents $I_{ref\_1}$, $I_{ref\_2}$, and $I_{ref\_n}$, which are well matched because transistors M1-M4 share a common gate-to-source voltage ($V_{DD}-V_{control}$). A common centroid layout may be used for transistors M1-M4 to improve matching.

Figure 8:
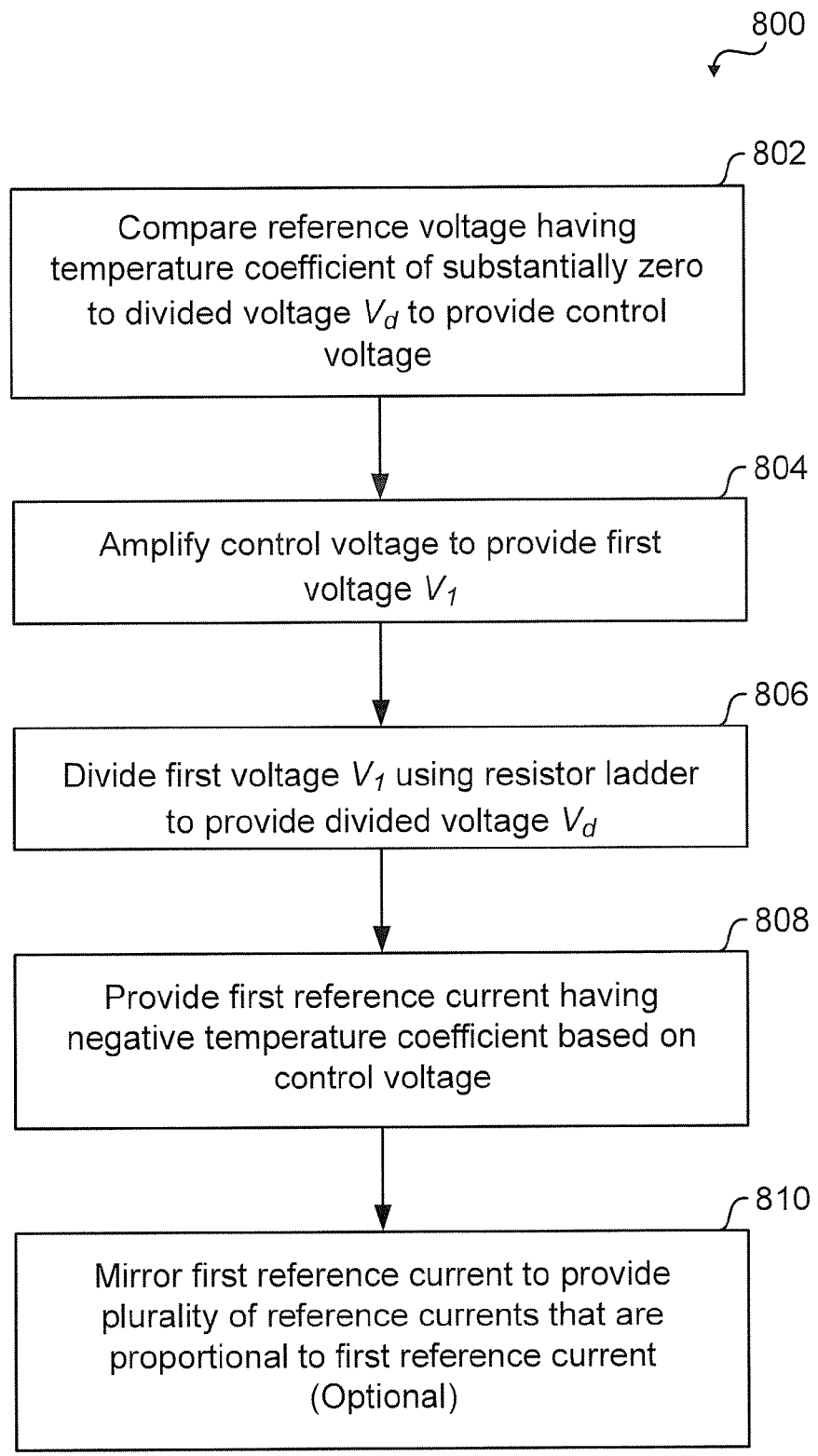
FIGS. 8-9 are flowcharts of methods of providing one or more reference currents having negative temperature coefficients in accordance with embodiments disclosed herein.
Figure 9:
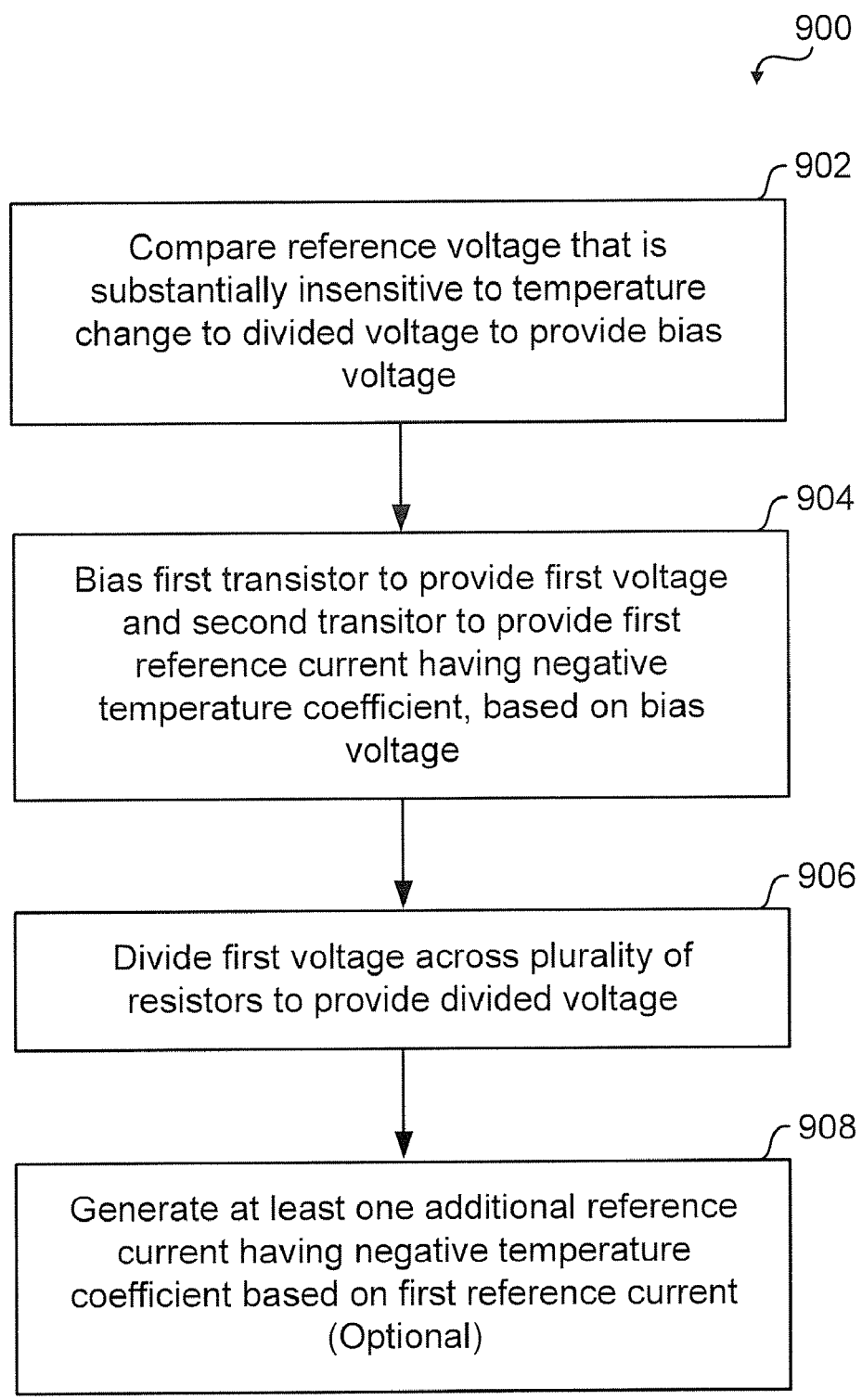

FIGS. 8-9 are flowcharts of methods of providing one or more reference currents having negative temperature coefficients in accordance with embodiments disclosed herein. The embodiments described herein, however, are not limited to the descriptions provided by the flowcharts. Rather, it will be apparent to persons skilled in the relevant art(s) from the teachings provided herein that other functional flows are within the scope and spirit of the embodiments.

Methods 800 and 900 will be described with continued reference to the example current reference module implementations and components thereof described above in reference to FIGS. 3 and 5-7, though the methods are not limited to those embodiments.

Referring now to FIG. 8, a reference voltage having a temperature coefficient of substantially zero is compared to a divided voltage $V_d$ to provide a control voltage at block 802. For example, operational amplifier 302 may compare the reference voltage to the divided voltage $V_d$. The reference voltage may be a bandgap reference voltage, though the embodiments described herein are not limited in this respect. At block 804, the control voltage is amplified to provide a first voltage $V_1$. For instance, amplification module 304 may amplify the first voltage $V_1$. The first voltage $V_1$ is divided using a resistor ladder to provide the divided voltage $V_d$ at block 806. For example, voltage divider 308 may include a resistor ladder to divide the first voltage $V_1$. At block 808, a first reference current having a negative temperature coefficient is provided. The first reference current is based on the control voltage. For instance, current module 306 may provide the first reference current.

The first reference current optionally may be mirrored to provide a plurality of reference currents that are proportional to the first reference currents at block 810. For example, current mirror module 602 may mirror the first reference current to provide the plurality of reference currents. In another example, current modules 604, 606, and 608 may mirror the first reference current to provide the plurality of reference currents. In yet another example, current modules 702 and 704 may mirror the first reference current to provide the plurality of reference currents.

The divided voltage $V_d$ may be represented by the equation:

$$V_d = \left(\frac{R_0}{R_{TOTAL}}\right) * V_1 \quad \text{Equation 16}$$

where $R_0$ is the resistance of a portion of the resistor ladder, and $R_{TOTAL}$ is the cumulative resistance of the entire resistor ladder. The negative temperature coefficient may be calculated using equation 15 by substituting $R_0$ for the variable $R_2$.

In FIG. 9, a reference voltage that is substantially insensitive to temperature change is compared to a divided voltage to provide a bias voltage at block 902. For instance, operational amplifier 302 compares the reference voltage to the divided voltage. The reference voltage may be a bandgap reference voltage, though the embodiments described herein are not limited in this respect. At block 904, a first transistor is biased to provide a first voltage and a second transistor is biased to provide a first reference current having a negative temperature coefficient, based on the bias voltage. For example, operational amplifier 302 may bias the first and second transistors. At block 906, the first voltage is divided across a plurality of resistors to provide the divided voltage. For instance, voltage divider 308 may divide the first voltage.

At least one additional reference current having a negative temperature coefficient optionally may be generated based on the first reference current. For example, any one or more of current modules 604, 606, 608, 702, and/or 704 may generate the at least one additional reference current.

The embodiments described herein may reduce or eliminate self-heating issues associated with conventional current reference modules. For instance, the embodiments may reduce the sensor junction temperature of an imager during extended operation of the imager. Moreover, lower power consumption, less dark current, and/or fewer hot pixels may be associated with an imager that utilizes the current reference techniques described herein, as compared to conventional current reference techniques.

The current reference module in accordance with the disclosed embodiments may also be used to bias other elements of an electronic system to reduce or eliminate self-heating issues associated with those elements.

Figure 10:
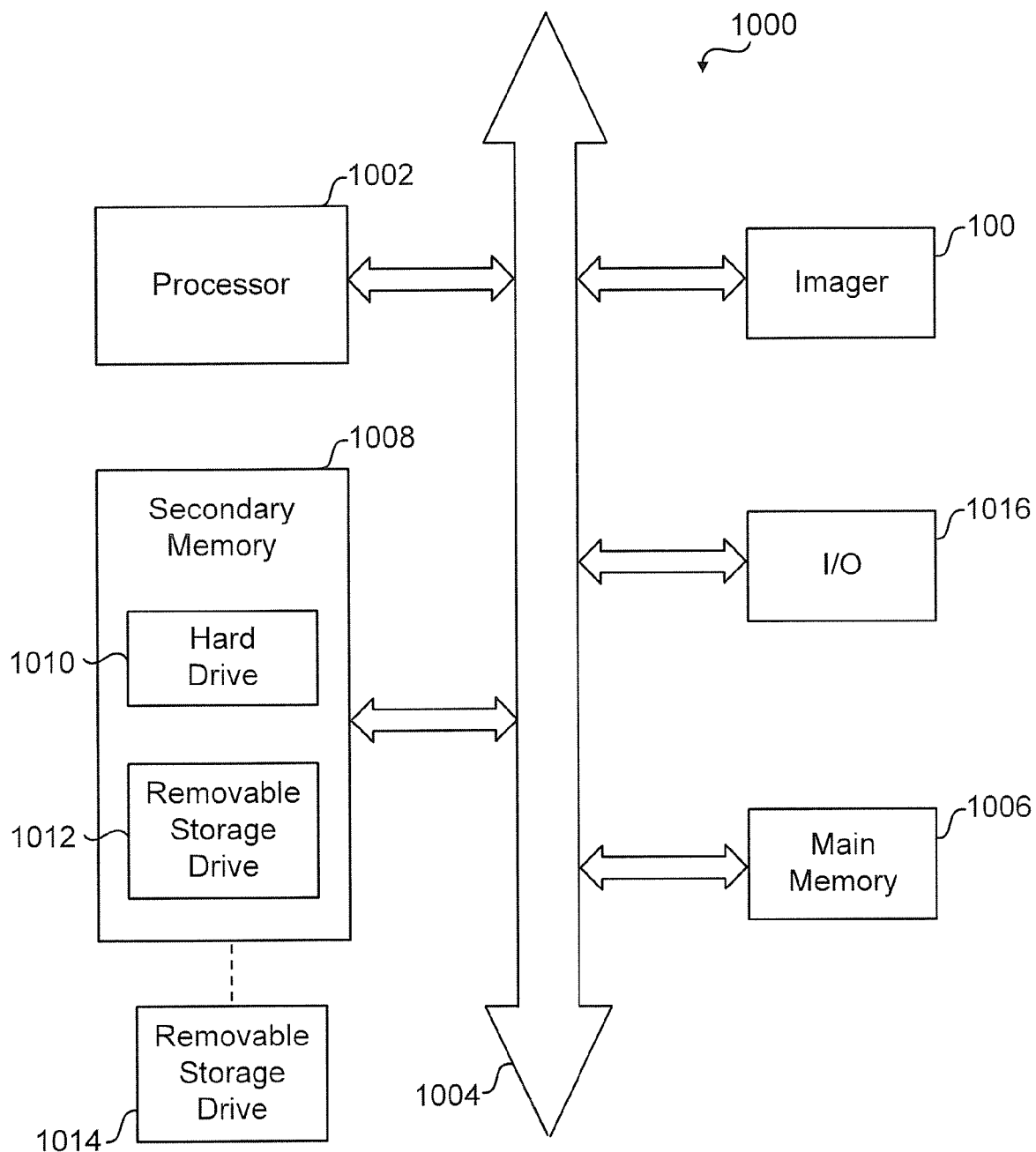
FIG. 10 is an example processor system that includes an imager in accordance with an embodiment disclosed herein.

FIG. 10 is a block diagram of an example processor system 1000 that includes an imager, such as imager 100 of FIG. 1 having a current reference module, in accordance with an embodiment disclosed herein. Although imager 100 includes the current reference module, other components of system 1000 that require a reference current may also utilize the current reference module. Without being limiting, processor system 1000 may include a computer system, camera system, scanner, machine vision, vehicle navigation, video phone, surveillance system, auto focus system, star tracker system, motion detection system, image stabilization system, data compression system, etc.

Referring to FIG. 10, imager 100 provides an image from a pixel array. System 1000 includes one or more processors, such as processor 1002, which are capable of processing the image. Image processor 120 of FIG. 1 processes the image. Then processor 1002 may output the image to a display, store it in storage, output the image, and/or further process the image prior to display, storage, or output of the same. Processor 1002 may be any type of processor, including but not limited to a special purpose or a general purpose digital signal processor.

System 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, etc. Removable storage drive 1012 reads from and/or writes to a removable storage unit 1014 in a well known manner. Removable storage unit 1214 represents a floppy disk, magnetic tape, optical disk, etc. As will be appreciated, removable storage unit 1014 includes a computer usable storage medium having stored therein computer software and/or data.

Communication infrastructure 1004 (e.g., a bus or a network) facilitates communication among the components of processor system 1000. For example, imager 100, input/output (I/O) device 1016, main memory 1006, and/or secondary memory 1008 may communicate with processor 1002 or with each other via communication infrastructure 1004.

System 1000 may further include a display interface, which forwards graphics, text, and/or other data from communication infrastructure 1004 (or from a frame buffer not shown) for display on a display unit.

According to the embodiments described herein, imager 100 may be combined with processor 1002, such as a CPU, digital signal processor, or microprocessor, with or without memory storage on a single integrated circuit or on a different chip than the processor.

It will be recognized by persons skilled in the relevant art(s) that the negative temperature coefficient current referencing techniques described herein may be implemented as control logic in hardware, firmware, or software or any combination thereof.

Figure 11:
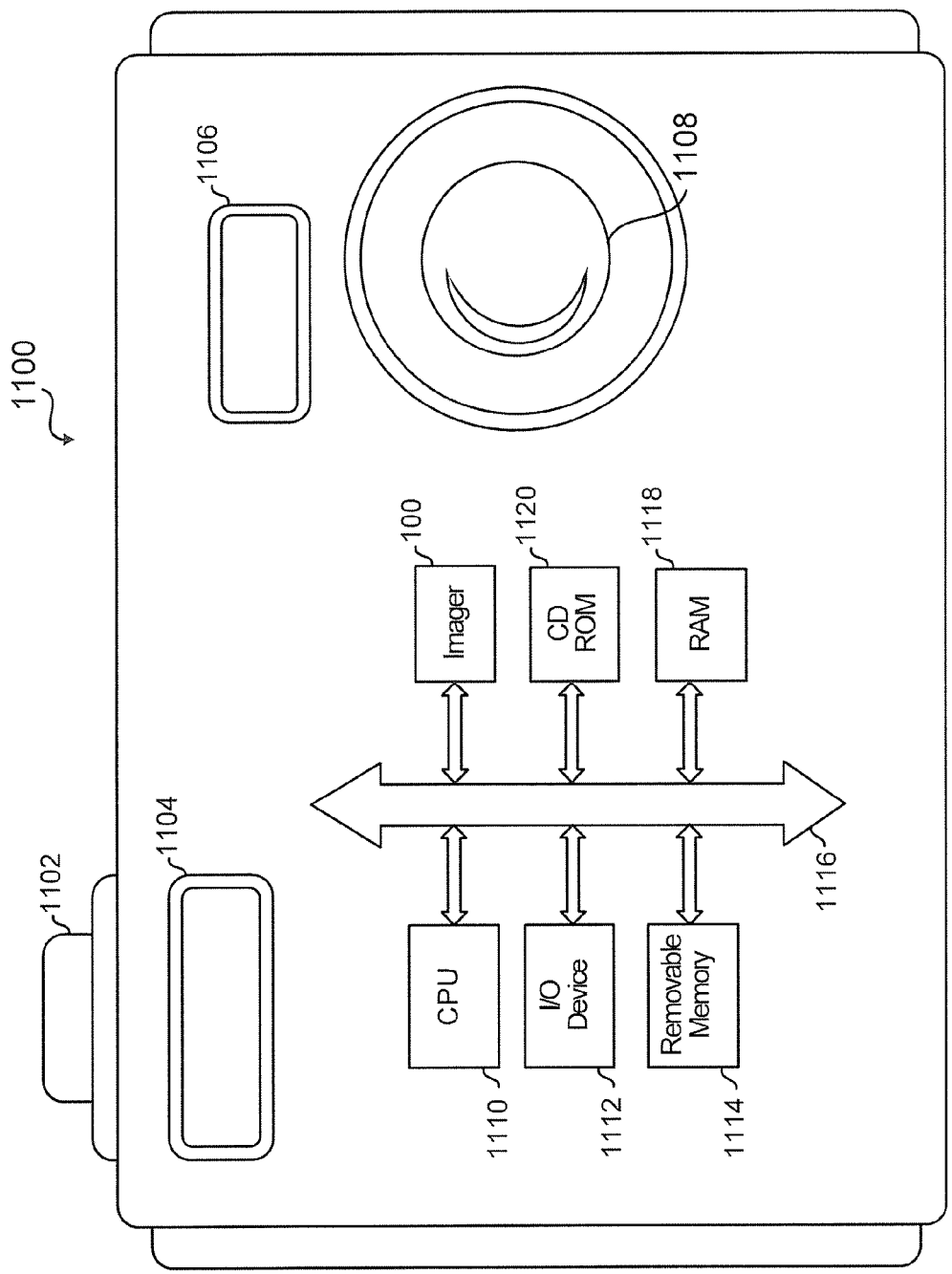
FIG. 11 is a block diagram of an image processing system, incorporating an imager in accordance with the method and apparatus embodiments described herein.

FIG. 11 is a block diagram of an image processing system, e.g., a camera system, 1100 incorporating an imager 100 having a current reference module in accordance with the method and apparatus embodiments described herein. Although imager 100 includes the current reference module, other components of system 1100 that require a reference current may also utilize the current reference module. In FIG. 11, imager 100 provides an image output signal as described above. A camera system 1100 generally includes a shutter release button 1102, a view finder 1104, a light source 1106 and a lens system 1108. A camera system 1100 generally also includes a camera control central processing unit (CPU) 1110, for example, a microprocessor, that communicates with one or more input/output (I/O) devices 1112 over a bus 1116. CPU 1110 also exchanges data with random access memory (RAM) 1118 over bus 1116, typically through a memory controller. A camera system 1100 may also include peripheral devices such as a removable flash memory 1120, which also communicates with CPU 1110 over bus 1116. System 1100 is capable of capturing video frames for processing in accordance with the negative temperature coefficient current referencing techniques described herein.

A CMOS imager is disclosed herein for illustrative purposes. However, persons skilled in the relevant art(s) will recognize that the invention can be applied to components of a charge-coupled device (CCD) or other imaging system.

Example embodiments of methods, systems, and components thereof have been described herein. As noted elsewhere, these example embodiments have been described for illustrative purposes only, and are not limiting. The breadth and scope of the present invention should not be limited by any of the above described exemplary embodiments, but should be defined only in accordance with the following claims and their equivalents.

What is claimed as new and desired to be protected by Letters Patent of the United States is:

1. An apparatus comprising:
    an operational amplifier configured to provide a control signal based on a difference between a reference voltage that is substantially insensitive to a temperature change and a feedback voltage;
    an amplification module that is coupled to the operational amplifier, that receives the control signal, and that is configured to provide a first voltage based on the control signal;
    a feedback path that is coupled to the operational amplifier and that is configured to provide the feedback voltage to the operational amplifier, wherein the feedback voltage is based on the first voltage; and
    a current module that is coupled to the operational amplifier, that receives the control signal, and that is configured to provide a first reference current having a negative temperature coefficient, wherein the first reference current is based on the control signal.

2. The apparatus of claim 1, wherein the amplification module is a first transistor, and the current module is a second transistor.

3. The apparatus of claim 1, wherein the amplification module includes first transistors having a cascode configuration, and the current module includes second transistors having a cascode configuration.

4. The apparatus of claim 1, wherein the current module is further configured to provide at least one additional reference current having a negative temperature coefficient, based on the control signal.

5. The apparatus of claim 1, wherein the reference voltage is a bandgap reference voltage.

6. An apparatus comprising:
    an operational amplifier configured to provide a control signal based on a difference between a reference voltage that is substantially insensitive to a temperature change and a divided voltage;
    an amplification module that is coupled to the operational amplifier, that receives the control signal, and that is configured to provide a first voltage based on the control signal;
    a voltage divider module that is coupled to the amplification module, that receives the first voltage, and that is configured to provide the divided voltage to the operational amplifier, wherein the divided voltage is proportional to the first voltage; and
    a current module that is coupled to the operational amplifier, that receives the control signal, and that is configured to provide a first reference current having a negative temperature coefficient, wherein the first reference current is based on the control signal.

7. The apparatus of claim 6, wherein the voltage divider module comprises:
    a first resistor coupled between an output of the amplification module and an input of the operational amplifier, and
    a second resistor coupled between the input of the operational amplifier and a node;
    wherein $$TC \approx -\frac{1}{R_2}\frac{\partial R_2}{\partial T},$$

wherein TC is the negative temperature coefficient, $R_2$ is a resistance of the second resistor, and T is a temperature of the second resistor.

8. The apparatus of claim 6, wherein an absolute value of the negative temperature coefficient is less than 1000 parts-per-million when a temperature of the voltage divider module is about 25° Celsius.

9. The apparatus of claim 6, wherein an absolute value of the negative temperature coefficient is less than 500 parts-per-million when a temperature of the voltage divider module is about 25° Celsius.

10. The apparatus of claim 6, wherein the reference voltage has a temperature coefficient having an absolute value of less than 50 parts-per-million at a temperature of about 25° Celsius.

11. The apparatus of claim 6, wherein the reference voltage is a bandgap reference voltage.

12. An apparatus comprising:
a first transistor and a second transistor having a first common control node;
an operational amplifier having an output coupled to the first common control node to bias the first transistor to provide a first voltage and the second transistor to provide a first reference current having a negative temperature coefficient, based on a difference between a reference voltage having a temperature coefficient of substantially zero and a feedback voltage;
first and second resistors coupled in series between an output node of the first transistor and a reference potential to provide the feedback voltage at a first node between the first and second resistors; and
a feedback to provide the feedback voltage from the first node to an input of the operational amplifier.

13. The apparatus of claim 12, further comprising:
a third transistor and a fourth transistor having a second common control node, wherein the third transistor is coupled between the output node of the first transistor and the first resistor, and wherein the fourth transistor is coupled to an output node of the second transistor.

14. The apparatus of claim 12, further comprising:
one or more third transistors sharing the first common control node, wherein the operational amplifier is configured to bias the one or more third transistors to provide one or more respective reference currents, each having a negative temperature coefficient.

15. The apparatus of claim 12, wherein $$TC \approx -\frac{1}{R_2}\frac{\partial R_2}{\partial T},$$

wherein TC is the negative temperature coefficient, $$\frac{\partial R_2}{\partial T}$$

is a partial derivative of $R_2$ with respect to a temperature of the second resistor.

16. The apparatus of claim 12, wherein the reference voltage is a bandgap reference voltage.

17. A method comprising:
comparing a reference voltage that is substantially insensitive to a temperature change and a divided voltage to provide a bias voltage;
biasing a first transistor to provide a first voltage and a second transistor to provide a first reference current having a negative temperature coefficient, based on the bias voltage; and
dividing the first voltage across a plurality of resistors to provide the divided voltage.

18. The method of claim 17, further comprising:
generating at least one additional reference current having a negative temperature coefficient based on the first reference current.

19. The method of claim 17, wherein $$TC \approx -\frac{1}{R_1}\frac{\partial R_1}{\partial T},$$

wherein TC is the negative temperature coefficient, R is a resistance of a first resistor of the plurality of resistors, and $$\frac{\partial R}{\partial T}$$

is a partial derivative of R with respect to a temperature of the first resistor.

20. The method of claim 17, wherein the reference voltage is a bandgap reference voltage.

* * * * *